United States Patent [19]

Harper

[11] 4,109,927
[45] Aug. 29, 1978

[54] HAND POWERED AND CONTROLLED TRICYCLE

[76] Inventor: Randall L. Harper, 1347 Lamar, Lakewood, Colo. 80215

[21] Appl. No.: 608,662

[22] Filed: Aug. 28, 1975

[51] Int. Cl.² ............................................. B62M 1/14
[52] U.S. Cl. ............................. 280/250; 280/112 A; 280/242 R; 280/282
[58] Field of Search ................... 280/250, 249, 242 R, 280/242 WC, 243, 244, 248, 232, 233, 234, 112 A, 87 R, 282, 286

[56] References Cited

U.S. PATENT DOCUMENTS

| 232,825 | 10/1880 | Johnson | 280/249 |
| 509,787 | 11/1893 | Au | 280/249 |
| 598,511 | 2/1898 | Hempstead | 280/234 |
| 1,304,790 | 5/1919 | Maulden et al. | 280/250 |
| 2,004,683 | 6/1935 | Wright et al. | 280/282 |
| 2,533,728 | 12/1950 | Gedat et al. | 280/233 |
| 2,592,025 | 4/1952 | Gray | 280/250 |
| 2,926,024 | 2/1960 | Huebener et al. | 280/248 |
| 3,381,973 | 5/1968 | Carr | 280/242 WC |
| 3,848,891 | 8/1973 | Vittori | 280/250 |
| 3,854,754 | 4/1974 | Jablonski | 280/249 |
| 3,869,146 | 3/1975 | Bulmer | 280/242 WC |
| 3,910,599 | 10/1975 | Thomas | 280/234 |

FOREIGN PATENT DOCUMENTS

| 466,614 | 5/1914 | France | 280/233 |
| 931,232 | 2/1948 | France | 280/234 |
| 850,091 | 12/1939 | France | 280/250 |
| 461,732 | 8/1926 | Fed. Rep. of Germany | 280/249 |
| 415,984 | 11/1946 | Italy | 280/250 |
| 488,625 | 12/1953 | Italy | 280/234 |
| 411,370 | 8/1945 | Italy | 280/233 |
| 22,306 of | 1898 | United Kingdom | 280/233 |

*Primary Examiner*—Joseph F. Peters, Jr.
*Assistant Examiner*—Terrance L. Siemens
*Attorney, Agent, or Firm*—John E. Reilly

[57] ABSTRACT

A wheeled vehicle is arranged to be completely hand powered and controlled. Since primary utility is for paraplegics, the vehicle is preferably configured as a tricycle using wheels specifically dimensioned as for use with bicycles. A column is pivoted around the front of the main frame of the vehicle with a front wheel attached at one end and a hand crank assembly attached at the other end in a manually accessible position relative to the vehicle seat. The crank assembly is coupled to drive the front wheel and includes rotatable sleeves on the grip with control mechanisms attached to these rotatable sleeves. By including brake actuating levers on the sleeve, the vehicle can be motivated, braked and/or steered by hand. Shifting mechanisms for speed control can be included either in proximity to the seat on the main frame or on the grip sleeves through suitable adaptations. A mechanism can be included to permit repositioning the grip cranks into any of a plurality of relative radial orientations.

14 Claims, 15 Drawing Figures

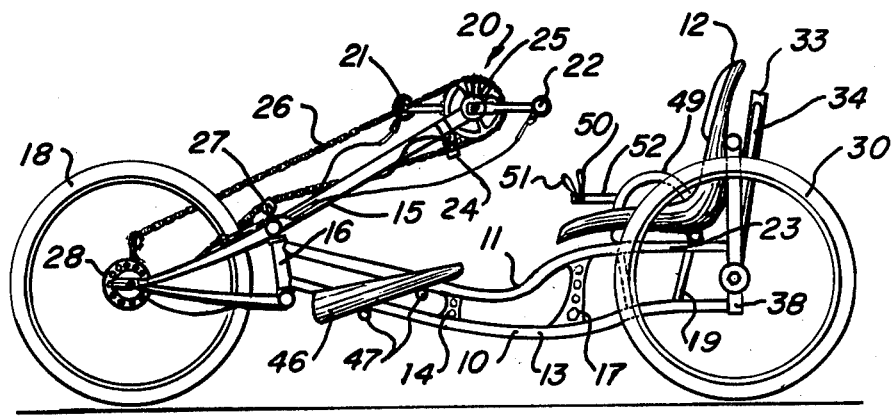
Fig_1
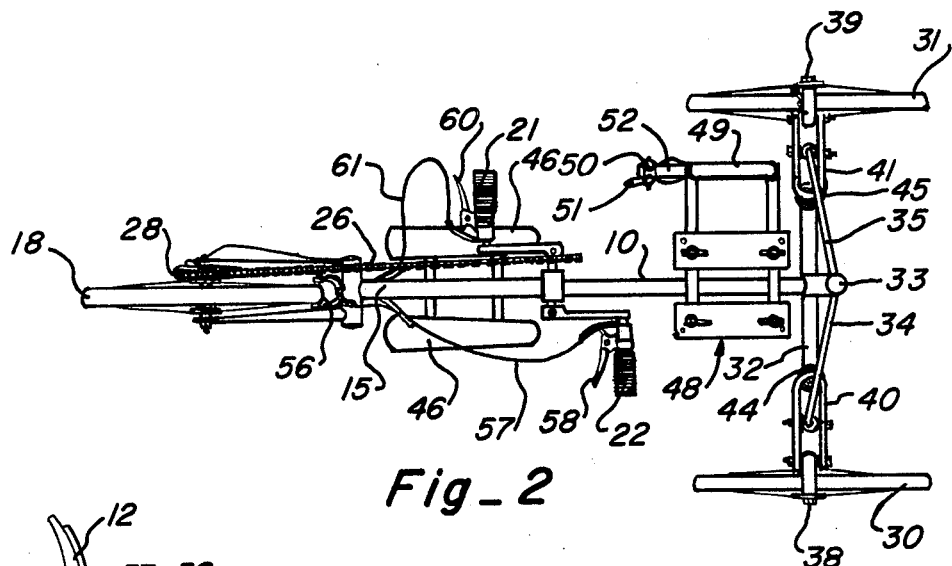
Fig_2
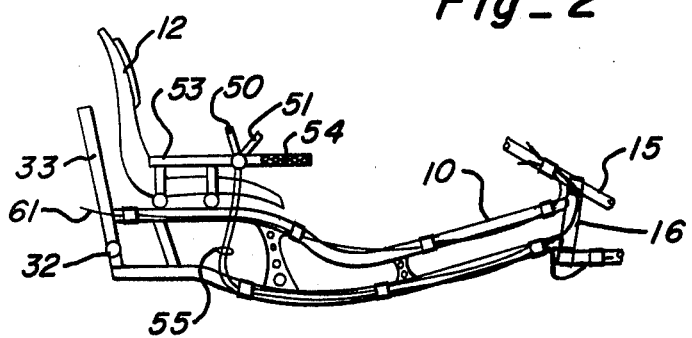
Fig_3

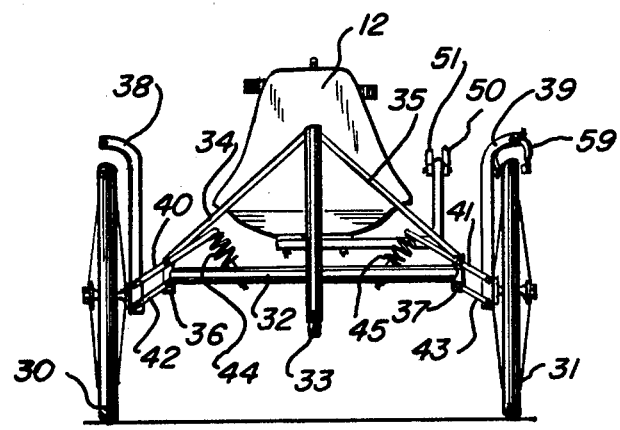
Fig_4
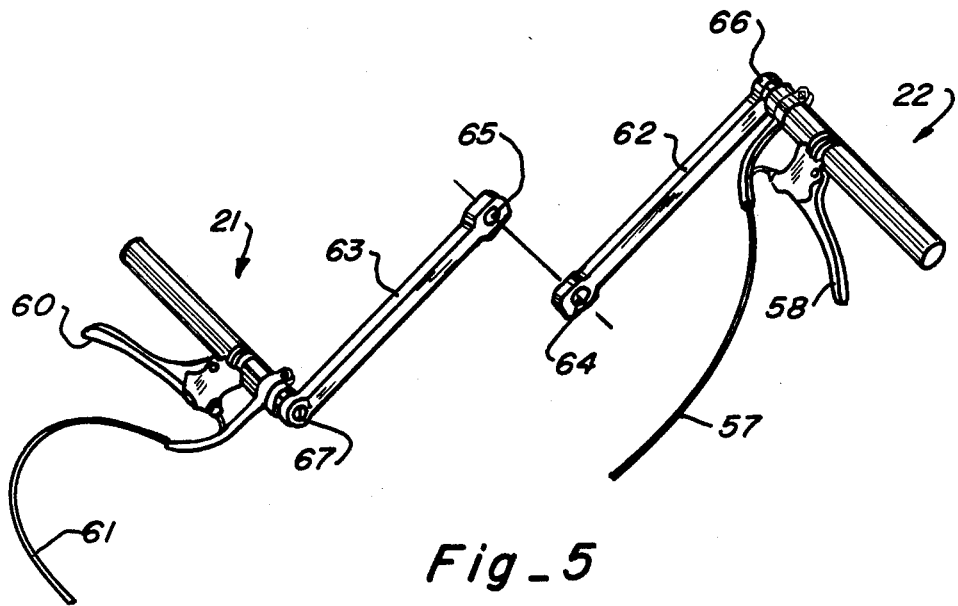
Fig_5

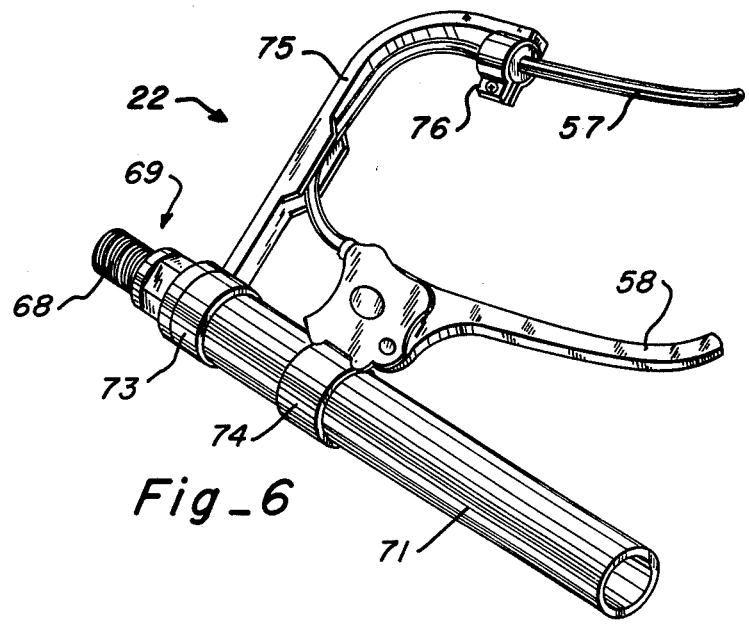
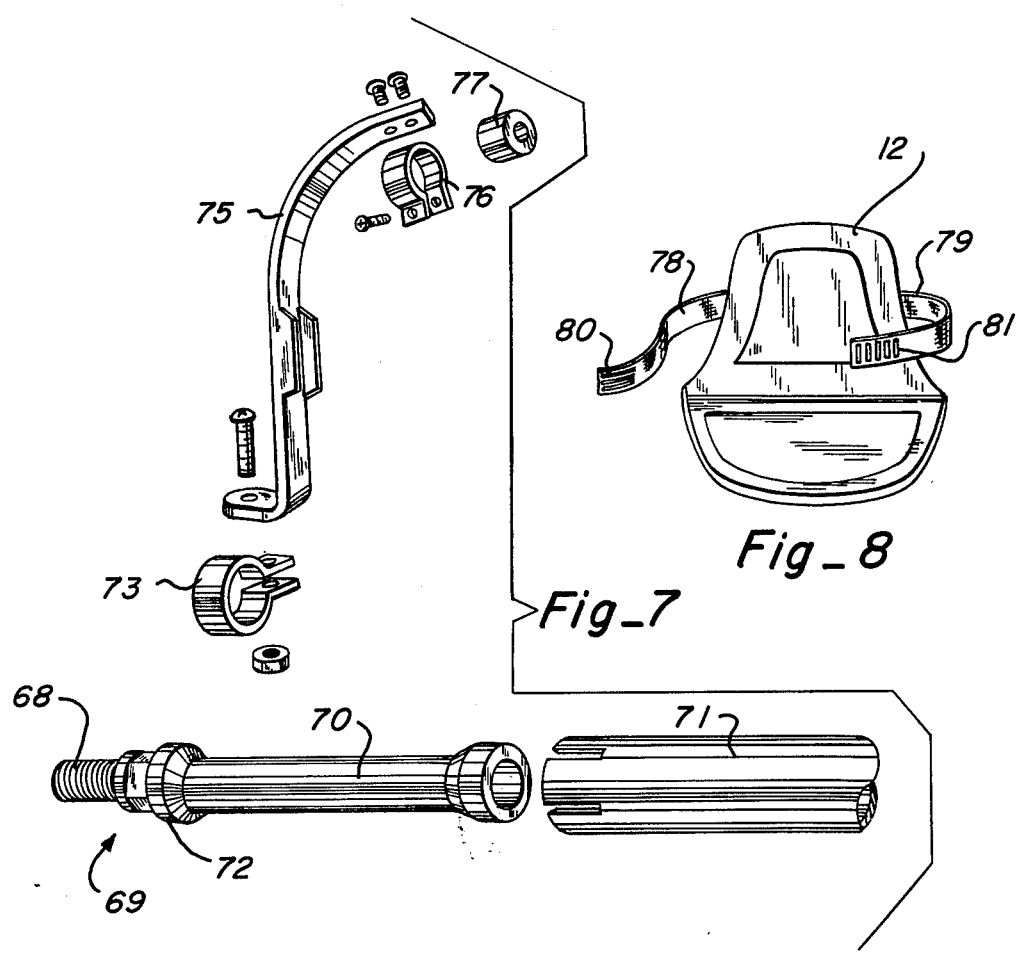

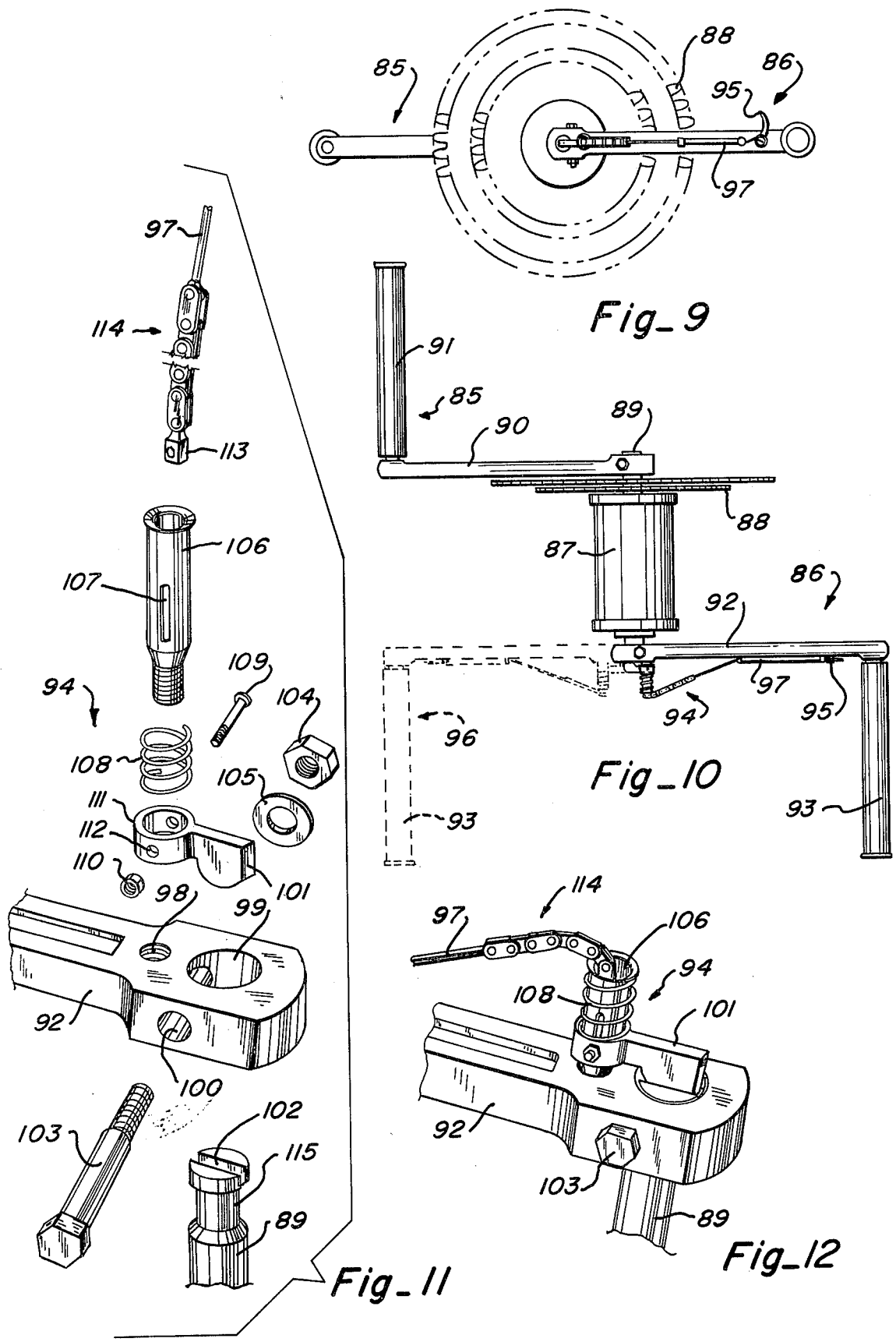

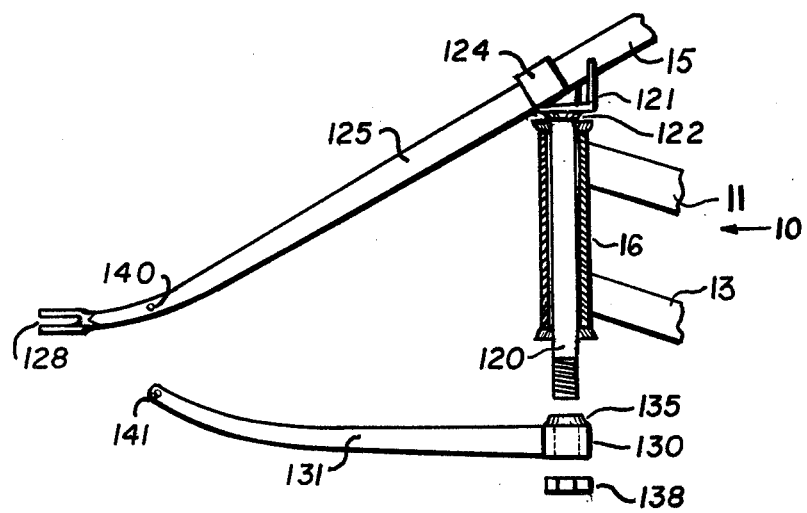
Fig_13
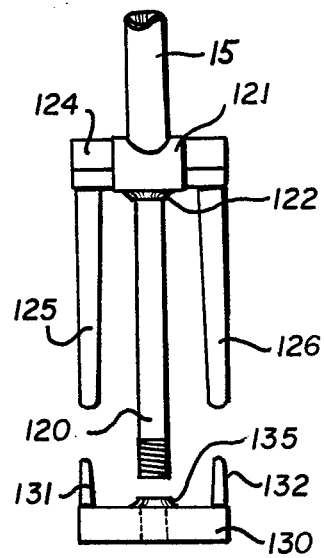
Fig_14
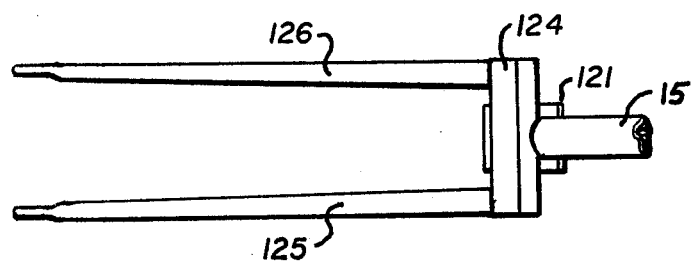
Fig_15

HAND POWERED AND CONTROLLED TRICYCLE

BACKGROUND OF THE INVENTION

The present invention relates to wheeled vehicles particularly of the bicycle and tricycle variety which are motivated by the user. More particularly, the present invention relates to wheeled vehicles which are hand powered and controlled. The present invention is particularly useful in providing relatively high speed transport for anyone who has reduced or non-existent leg functions and therefore must predominantly rely upon hand and arm functions for motivation.

Bicycle-type wheeled vehicles have been historically popular as an economic means of relatively high speed transport and also as an exercise medium. More recently, bicycle-type devices have become even more popular in view of the energy situation. The bicycle industry has seen many developments over the years to reach its present state of the art. For instance, multiple speed transmissions such as the now popular three and ten speed devices have significantly expanded the range of topographical utility for bicycle-type vehicles. Furthermore, tricycles using bicycle-type wheels and drive/control mechanisms have also become popular of recent particularly for those of less trustworthy sense of balance.

Unfortunately, paraplegics or those having reduced leg function capabilities have been substantially denied enjoyment of the advantages and benefits of advancements in the bicycle/tricycle arts since such developments have been predominantly dependent upon leg controls and/or motivation. The development of hand and electrically powered wheelchairs has increased the range of travel for paraplegics but still restricts the user to relatively small geographic transport. Thus there has been a continuing need for a wheeled vehicle which can significantly increase the range of travel for the paraplegic in a manner at least reasonably comparable with the state of the art bicycle.

There have been several efforts over a considerable period of time to provide a suitable hand powered vehicle to fill this need. For instance, U.S. Pat. No. 474,279 by Arnold shows an arrangement for a hand powered tricycle using a pump-type of activation mechanism. An arrangement for rotary crank motivation of a tricycle vehicle is shown in U.S. Pat. No. 2,004,683 by Wright et al and a somewhat related offset crank arrangement is shown in U.S. Pat. No. 3,848,891 by Vittori. Further, an expanded wheelchair including the so-called coaster brake and drive mechanism for the front wheel thereof is shown in U.S. Pat. No. 3,485,510 by Merlan. A still further arrangement is shown in U.S. Pat. No. 3,493,245 by Nabinger which includes an adjustable seat arrangement with rear wheel powered cranking mechanism and separate steering.

However, none of the prior art vehicles permit advantageous utilization of the various developments in the bicycle industry such as the clamp or gripping type brake mechanism and the multiple speed transmission devices. Further, in order to maintain continuous control of the vehicle, it is essential that the braking mechanism associated therewith be manually available to the user so that it can be operated without releasing the crank grip thereby reducing the steering control available. Still further, it is important that the braking mechanism be available for preferably more than one of the wheels of the vehicle and definitely not for the front wheel alone as is suggested by the aforementioned Wright et al and Merlan patents. Still further, there has been a continuing need for a position control relative to the handlebar grips of the crank mechanism to permit selection of various radial orientations therebetween so as to accommodate optimum steering or powering positions.

SUMMARY OF THE INVENTION

The present invention is a hand powered and controlled wheeled vehicle which makes available a range of travel and mechanical advantage comparable to state of the art bicycles for paraplegics or those having reduced leg function capabilities. Although the present invention is by no means limited to three-wheeled vehicles, the invention will be primarily described in conjunction with a tricycle, in contrast to a bicycle, since generally those with a reduced or non-existent leg function capability must rely upon a stable framework relative to the surface or roadway in lieu of resort to the use of their legs for recovering their balance. The main frame of the vehicle has spaced rear wheels and the seat attached thereto with a front wheel pivotally attached to the frame via a combination steering, powering and control column. The column includes an offset crank-type handlebar arrangement for rotary hand power with this crank mechanism being coupled to the drive hub of the front wheels. Each of the grips of the crank mechanism include a sleeve arrangement which is attached thereto but in a manner which permits rotation of the sleeve about the grip bar. Control apparatus such as lever actuator devices for gripper brakes can be attached to the sleeves so that the brakes can be manually available to the user without becoming entangled in the drive mechanism. If a multiple speed drive transmission is included with the front wheel hub, the selector apparatus associated therewith can be positioned either in manually accessible locations on the main frame with suitable connections past the column pivot point to the hub or can be attached to the rotating handle grip sleeves with suitable adaptation.

Another feature contemplated by the present invention is to include a releasable interlocking arrangement for the rotary hand cranks so as to permit selecting amongst various radial orientations of the grips relative to each other. This particular feature allows the user to position the grips for optimum cranking as in a relative Z orientation or for optimum steering as in a relative U orientation for maximum mechanical advantage.

An object of the present invention is to provide a novel and improved hand powered and controlled wheeled vehicle particularly well-suited for use by paraplegics or those having reduced leg function.

Another object of this invention is to provide a hand powered and controlled vehicle which significantly increases the range of travel and mechanical advantage for paraplegics.

A still further object of this invention is to provide a hand operated, motivated and controlled wheeled vehicle which is stable relative to the surface over which it travels and which places all needed controls and selector apparatus in easy access to the user.

A still further object of this invention is to provide a hand powered and controlled tricycle which advantageously incorporates the use of multiple wheel brakes and multiple speed drive transmission devices.

Yet another object of this invention is to provide a mechanism for use in a hand powered vehicle which includes a rotary crank drive apparatus which allows the user to select amongst various orientations of the grip devices associated with the crank apparatus.

The foregoing and other objects, features and advantages of the present invention will be more apparent in view of the following detailed description of the preferred embodiment.

BRIEF DESCRIPTION OF THE DRAWINGS

FIG. 1 is a side view of a hand powered and controlled tricycle in accordance with one form of the preferred embodiment of this invention.

FIG. 2 is a top view of the FIG. 1 embodiment.

FIG. 3 is a side view of a portion of the tricycle frame particularly illustrating the arrangement of control cables and additionally showing one modification of the speed selector mounting structure.

FIG. 4 is a rear view of the preferred embodiment.

FIG. 5 is a perspective view of the grip apparatus associated with the cranking mechanism of the preferred embodiment.

FIG. 6 illustrates an additional close-up view of one grip apparatus including a brake actuator lever.

FIG. 7 is an exploded view of the FIG. 6 apparatus.

FIG. 8 illustrates one arrangement of incorporating a seat belt in the present invention.

FIG. 9 is a side view of an offset crank mechanism including a radial orientation position selector arrangement.

FIG. 10 is a top view of the FIG. 9 apparatus illustrating two selectable radial positions.

FIG. 11 is an exploded view of the components employed in the radial position apparatus of FIGS. 9 and 10.

FIG. 12 is a perspective view of the radial position selecting apparatus of FIGS. 9-11.

FIG. 13 is a partially exploded, partially sectioned view of the front wheel and steering column mounting assembly.

FIG. 14 is a rear view of the FIG. 13 assembly; and

FIG. 15 is a top view of the FIG. 13 assembly.

DETAILED DESCRIPTION OF THE PREFERRED EMBODIMENT

As mentioned above, the preferred embodiment will be illustrated and described for particular use by a person who has little or no leg function capability available and thus must rely upon the vehicle configuration for stability. Thus, as illustrated in FIGS. 1 and 2, the preferred embodiment is shown and described as a tricycle-type device which preferably employs wheels configured of the same general dimensions as state of the art bicycles. The main frame or chassis 10 as shown comprises upper and lower arcuate tubular members 11 and 13 diverging somewhat rearwardly away from one another in a vertical plane and interconnected in a structurally rigid frame by spaced webs 14, 17 and 19. As illustrated, the resultant frame 10 forms a raised portion 23 at its rearward end for mounting of a seat 12 by the user.

A column 15 is attached to the forward extremity of main frame 10 at post 16 so that column 15 can be laterally pivoted around post 16 for steering. Column 15 has front wheel 18 rotatably attached thereto by a fork mount arrangement extending forwardly on opposite sides of frame 10 from upper and lower ends of post 16.

The column 15 inclines upwardly and rearwardly from the post 16 to terminate in an offset crank assembly 20 rotatably journaled thereto including means to provide for hand motivation and hand control of the vehicle, the controls in this particular embodiment including wheel braking mechanisms hereinafter described. Assembly 20 includes offset grip arrangements 21 and 22 which will be described in greater detail hereinbelow and which are coupled for imparting rotary motion to drive sprocket gear 25 thereby driving chain 26 which is supported on the lower side thereof by roller 27 mounted in proximity to the pivotal axis of post 16. Chain 26, as shown in this example, ultimately drives a conventional 10-speed transmission 28 of front wheel 18. Column 15 can also include an additional rigid extension with appropriate padding [not shown] to act as a guard to prevent an occupant of the seat from being thrown against gears 25 and/or cranks 21 and 22.

Rear wheels 30 and 31 are spring suspended from crossbeam 32 as can be seen in FIGS. 1, 2 and 4. Beam 32 is rigidly attached to the main frame 10 as an extension from vertical column 33 thereof. As best seen in FIGS. 2 and 4, vertical column 33 has angled braces 34 and 35 extending downwardly from the upper end thereof with braces 34 and 35 being rigidly attached to stubs 36 and 37 as is crossbeam 32. Inverted J-shaped side members 38 and 39 are pivotally secured to stubs 36 and 37 by double pivot members defined by U-shaped members 40 and 41 [note FIG. 2] along the upper portion and by a pair of lower pivot links 42 and 43 on each side. Members 38 and 39 provide a means for appropriately positioning gripper brake mechanisms relative to the rear wheels 30 and 31, only one such brake mechanism 59 being shown in this exemplary embodiment. The upper and lower pivot linkages 40-43 are pivotally interconnected is spaced parallel relation to one another to stubs 36 and 37 and side members 38 and 39 so that rear wheels 30 and 31 are permitted only substantial vertical movement and the frame can undergo independent vertical suspension relative to the wheels. Springs 44 and 45 are attached between the extended ends of upper links 40 and 41 and crossbeam 32 so as to provide shock absorbing for the main frame 10.

As shown in FIGS. 1 and 2, upwardly facing, inclined channel members 46 are attached by crossbars 47 along each side of the forward portion of main frame 10 so as to accommodate the feet and legs of a user in seat 12. Channel 46 can include appropriate padding. A seat platform arrangement shown generally at 48 is rigidly attached to main frame 10. Also rigidly attached to platform assembly 48 is upwardly extending side arm 49 which has a pair of selector levers 50 and 51 attached to extension 52 thereof. Levers 50 and 51 are positioned in a manually accessible location relative to seat 12 and are connected via cables to the 10-speed transmission 28 of front wheel 18 to provide the speed selection operations as exist on present state of the art 10-speed bicycle transmissions. FIG. 3 illustrates another version of the mounting arrangement for selector levers 50 and 51 using a single straight side member 53 which extends beyond levers 50 and 51 to provide a grip 54 to assist the user in entry and exit from seat 12. As can also be seen from FIG. 3, the control cables 55 associated with selector levers 50 and 51 extend along the lower portion of main frame 10 and are connected across pivot post 16 with a small amount of slack to accommodate pivoting of column 15 about post 16. As with existing 10-speed bicycle shifting mechanisms, one of cables 55 extends to hub 28 to give five ratio selections while the other cable is connected to the chain shift mechanism 24 [note FIG. 1] for selecting between sprocket gears of different diameters. These control cables 55 may be a single cable with a single actuator or selector lever such as 50 being used if the transmission is of the 3-speed variety.

As best seen in FIG. 2, a front gripper brake assembly 56 is included for braking of front wheel 18 with this assembly being interconnected via cable 57 to lever actuator mechanism 58 on grip assembly 22. FIG. 4 illustrates the mounting arrangement for a rear wheel gripper assembly 59 for braking wheel 31 via actuation of lever 60 on assembly 21 which is interconnected by cable 61 to assembly 59. Brake cables 57 and 61 are retained along column 15 to a point in proximity to the vertical pivot post 16 where they then include a small amount of slack before proceeding forwardly and rearwardly to the brake assemblies 56 and 59. It should be noted that a single rear wheel brake assembly 59 has been found to be entirely satisfactory for operation particularly in conjunction with a front wheel brake assembly 56. However, it should be recognized that brake assemblies on any combination of the wheels or all of them can be included if desired.

The details of the arrangement for attaching the brake actuator levers 58 and 60 to the crank assemblies 21 and 22 are illustrated in FIGS. 5-7. Each assembly includes an elongated member 62 and 63 which are attached at one end via bores 64 and 65 to a shaft which is rotatably journaled through one end of column 15. It will be recognized that drive sprocket gear 25 is rigidly attached to crank assemblies 21 and 22 for transferring torque from the rotary motion thereof to the front wheels 18. The elongated members or arms 62 and 63 each have a threaded bore 66 and 67 through the other ends thereof for retaining the grip assemblies. This is illustrated in greater detail for assembly 22 in FIG. 6 and in the exploded view thereof for FIG. 7.

More particularly, a cylindrical internal spindle 69 terminates in a threaded end 68 for attachment within the threaded bore 66 of arm 62. Pivotally attached on spindle 69 is sleeve 70. Sleeve 70 is attached via bearing arrangements or the like in a manner similar to the attachment of spindles for foot pedals of existing bicycles. An additional hollow sleeve 71 fits over sleeve 70 so as to form the grip arrangement for the user's hand. One end of sleeve 71 is retained around collar 72 of sleeve 70 via split-ring collar 73. In addition, clamp 74 retains brake lever 58 around grip sleeve 71 so that lever 58 is pivotally retained in a relatively fixed position to actuate cable 57 for brake control as is well known. The assembly includes an arcuate channel member 75 which is likewise attached to split-ring collar 73 for guiding cable 57 and retaining it in a position clear of the grip 71 and lever 58. Preferably, guide 75 is an arced open channel arrangement as generally shown and can include an additional split ring collar connector 76 at one end with insert 77 being included for providing guidance of cable 57. Since the entire assembly including elements 70-77 is free to rotate arond spindle 69, the application of rotary motion to the crank assemblies can be preformed without twisting or fouling brake cable 57 while continuously retaining brake actuator lever 58 in proximity to the grip 71 so that the user need not significantly impair steering control in order to actuate the brakes. With suitable adaptations, other control mechanisms besides the brake controls could be similarly attached to grips such as 71.

FIG. 8 illustrates a safety belt attachment which has been found to be particularly advantageous for use in conjunction with the preferred embodiment. More particularly, seat 12 has two flexible side arms 78 and 79 rigidly attached to the back thereof although it will be readily recognized that arms 78 and 79 can actually be extensions of a single belt arrangement. Arm 78 has a series of horizontal strips such as 80 extending therealong while arm 79 has a series of vertical strips such as 81. These strips such as 80 and 81 can be composed of well known intermeshing material such as so-called Velcro which will firmly interengage when pressed together but which can be peeled apart with relative ease. The particular advantage of using the strips as illustrated is that the belts need no particular adjustment for different users but still provide adequate retention of the user when attached. Still further, the belts can be folded back against the rear of seat 12 and the strips 80 and 81 engaged to maintain the belt out of the way when it is not needed.

The mounting of the grip arrangements in the crank mechanism so that they are in a fixed Z-shaped orientation relative to one another as shown and described above is satisfactory for most purposes. However, an additional feature of the present invention relates to the apparatus shown in FIGS. 9-12 for the purpose of allowing the user to select between different radial interrelationships for the grips. This feature is shown in the side view of FIG. 9 and in the view of FIG. 10 wherein grip handle or crank assemblies 85 and 86 are depicted as in the same orientation as described previously. Crank assemblies 85 and 86 are attached to opposite ends of a shaft which is rotatably journaled through the steering column as at 87 so as to permit application of rotary torque to the chain drive mechanism 88.

Crank assembly 85 includes a side or crank arm 90 which is rigidly attached to the end of shaft 89 and which has a rotatable sleeve grip 91 extending perpendicular thereto. The other crank assembly 86 likewise includes a side or crank arm 92 and a rotatable sleeve grip 93 which extends perpendicular to the steering column on the side opposite assembly 85. However, assembly 86 also includes a releasable interlocking assembly 94 at one end thereof for permitting interchangeable orientation in a radial direction relative to shaft 89 for assemblies 85 and 86. As will be more apparent from the subsequent description, manual force applied to hook 95 releases the interlocking mechanism 94 and permits pivoting of assembly 86 around shaft 89 so as to reorient its relationship to assembly 85. For instance, the phantom position shown at 96 can be accomplished so that grips 93 and 91 are in alignment which is particularly well-suited for steering as might be desirable while coasting.

The apparatus for permitting this radial reorientation of crank assemblies 85 and 86 can best be seen from the exploded view of FIG. 11 and also in FIG. 12. The manually actuable hook 95 is pivotally attached to side arm 92 and connected to cable 97. Cable 97 terminates in a chain link arrangement 114 with an end link 113 having a bore therethrough.

Side arm 92 as shown in FIG. 11 has a threaded hole 98, a bore 99 and another transverse bore 100 all extending therethrough as shown. In assembly, shaft 89 is introduced through bore 99 so that diametric slot 102 across one end face thereof is accessible to the upper side of bore 99 in arm 92. Shoulder bolt 103 is then passed through bore 100 and bolted on the other side via nut 104 and lock washer 105. When in place, shoulder bolt 103 engages the interior of a groove 115 along one end of shaft 89 so as to allow rotary motion of arm 92 around shaft 89 but to substantially prevent any axial motion of arm 92 relative to shaft 89. The transfer of rotary torque from arm 92 to shaft 89 is effected by key or shoulder member 101.

Hollow cylindrical member 106 which has an outwardly flanged upper portion is threaded on the lower end for mating in threaded bore 98. Thus, in assembly, spring 108 is inserted around cylindrical member 106 and the member 106 is then passed through collar portion 111 of key shoulder element 101. Bolt 109 is passed through the bores through collar arrangement 111 such as bore 112 and through a pair of opposite longitudinal slots in cylindrical member 106 as illustrated at 107. Also in assembly, link 113 is passed into the hollow cylindrical member 106 and the bore through link 113 aligned with the holes in collar 111 as well as the longitudinal slots such as 107 in member 106. The resultant assembly is substantially as illustrated in FIG. 12 wherein key shoulder element 101 is shown engaging the diametric slot 102 of shaft 89 for torque transferral purposes.

When it is desired to reposition assemblies 85 and 86, the actuation of lever 95 will result in tension on cable 97 which is redirected by hollow cylinder 106 so as to pull upwardly on key shoulder 101 against the biasing force of spring 108 until the shoulder of 101 is clear of slot 102. At that point, the grip assembly 86 can then be freely pivoted or rotated about shaft 89 as accommodated by shoulder bolt 103 and radial or peripheral grooves 115. It should be understood that other angle slot positions could be included if desired and also other apparatus for permitting radial shifting between the shaft 89 and grip crank assembly 86 if desired. For instance, a gear arrangement on shaft 89 could be included and a segmented gear portion mating therewith biased into normal engagement or pivoted out of engagement in a manner somewhat similar to that described in FIGS. 11 and 12 if this should be desired.

Although not shown in FIGS. 9-12, it will be readily recognized that the rotatable following arrangement as discussed hereinbefore particularly for the attachment of the brake actuator levers can be included on the rotating sleeves 91 and 93. Another advantage of the general tricycle configuration shown for use by a paraplegic is its facility for entry and exit by a paraplegic. For instance, as can be best seen in FIG. 2, the rear wheels such as 30 can be appropriately spaced laterally from the seat 12 so that a wheelchair can be backed into proximity to seat 12. The user can then shift from the wheelchair into or out of the seat with relative ease. Still further, the assembly can easily accommodate an arrangement for attaching a wheelchair to the rear of the main frame 10 so that it will trail the bicycle during use and be available at a remote destination.

Details of one assembly for effecting the laterally pivotable attachment of the front wheel and steering column to the forward end of main frame 10 are shown in FIGS. 13-15. A shaft 120 is rigidly attached at one end to column 15 and also to L-shaped channel member 121. A ball or roller bearing 122 is positioned on the upper end of shaft 120 to fit within post 16. A crossbar 124 is likewise rigidly attached in transverse relation across the end of column 15 and provides the central portion of a U-shaped fork configuration with side arms 125 and 126. Slots in the ends of side arms 125 and 126 as at 128 accommodate mounting of the axle for front wheel 18. An additional U-shaped fork configuration is composed of crossbar 130 as the central portion thereof and side arms 131 and 132 rigidly attached as extensions and side arms 121 and 132 rigidly attached as extensions from crossbar 130. A lower ball or roller bearing 125 is positioned above bar 130 as shown so that shaft 120 can pass through the central bore thereof. Bearing 125 also fits within the lower end of post 16. The lower threaded end of shaft 120 passes through bearing 135 and the aligned bore of bar 130 and is secured by nut 138. The outer ends of side arms 131 and 132 are secured to respective side arms 125 and 126 such as by bolts through holes 140 and 141 thereby providing a solid structural mounting for the front wheel 18. The generally triangular shaped configuration defined in conjunction with shaft 120 in post 16 by side arms 125 and 131 on one side of wheel 18 and arms 126 and 132 on the other is effectively a sturdy extension of main frame 10. Further, note that positioning of main frame 10 in the general horizontal plane of the wheel axles provides a relatively low center of gravity and thus a stable riding platform for the user.

Although the present invention has been described with particularity relative to the foregoing exemplary preferred embodiment, various changes, additions, modifications and applications other than those specifically mentioned will be readily apparent to those having normal skill in the art without departing from the spirit of this invention.

What is claimed is:

1. In a hand-operated tricycle having a substantially horizontal frame disposed between a forward wheel and a pair of rearward wheels with each wheel having a central rotational axis, a seat mounted on said frame, and braking means for braking said tricycle, a manual control apparatus comprising:

a steering column having one end connected to said forward wheel and inclined upwardly and rearwardly at an acute angle less than 45° with respect to said horizontal frame, said horizontal frame disposed substantially in the plane of the rotational axes of said forward and rearward wheels, pivot means located at the forward end of said horizontal frame for pivotally connecting an intermediate portion of said steering column in laterally pivotal relation to said horizontal frame at a position substantially planar with the rotational axes of said wheels, drive means including a crank assembly rotatably connected to the end of said steering column opposite to said one end whereby said drive means is operative to drive said front wheel by rotary motion of said crank assembly, said crank assembly having a pair of elongated arms one on either side of said steering column, a sleeve rotatably attached to each said elongated arm in outwardly disposed relation thereto adapted to be gripped by the hands of the operator of said tricycle, a first manually actuable means attached to one of said sleeves being selectively actuable to control the braking of said tricycle, said manually actuable means having a flexible control means interconnecting said manually actuatable means and said braking means for operating said braking means by actuation of said manually actuable means, and a first rigid arcuate guide channel mounted in fixed relation to said one of said sleeves and adapted for receiving a portion of said flexible control means, said guide channel curving outwardly from its associated said elongated arm for a distance sufficient to prevent said flexible control means from contacting said sleeve when the associated said elongated arm is rotated through a 360° arc.

2. In a tricycle in accordance with claim 1, said braking means being associated with at least one of the wheels for selectively braking said wheel.

3. In a tricycle in accordance with claim 1, further including a second manually actuable means attached to the other of said sleeves and selectively actuable to control the braking of said tricycle, said braking means including a pair of braking members associated with different ones of said wheels for braking the motion of said tricycle, said second manually actuable means having a first flexible cable interconnecting said second manually actuable means and one of said braking members and having a second rigid arcuate guide channel attached to its associated said sleeve for receiving said first flexible cable, said second guide channel curving outwardly from its associated said elongated arm for a distance sufficient to retain said first flexible cable clear of said steering column and said crank assembly throughout the rotary motion thereof, said first and second manually actuable means each including a lever operated mechanism, said flexible control means being a second flexible cable.

4. In a tricycle in accordance with claim 1, said apparatus further including releasable positioning and locking means associated with said elongated arms for manually and selectively spacing said elongated arms in varied angular relation therebetween with respect to the rotational direction of said elongated arms.

5. In a tricycle in accordance with claim 1, said apparatus further including a shiftable multiple speed hub for said front wheel, a manually accessible selector lever, and means interconnecting said selector lever and said hub for permitting manual speed changing of said hub in response to actuation of said selector lever.

6. In a tricycle in accordance with claim 5, wherein said selector lever is mounted on said horizontal frame and said interconnecting means defined by cable means extending from said selector lever along said horizontal frame to the point of pivotal attachment of said steering column and thence to said hub.

7. In a manually powered vehicle having a frame, a steering column connected to said frame, a forward wheel rotatably connected to one end of said steering column, at least one rearward wheel rotatably secured to said frame, and a shaft rotatably journaled through said steering column at the end opposite said forward wheel for rotatably driving a device for coupling power to said forward wheel, apparatus comprising:

a crank assembly including first and second elongated arms, said first elongated arm being rigidly attached to the shaft on one side of the steering column and said second elongated arm being rotatably attached to the shaft on the side of the steering column opposite said first elongated arm, a pair of grip bars each connected in perpendicular relation to an associated one of said elongated arms, arm-engaging means normally biased for engaging said second elongated arm in one of a plurality of spaced angular positions relative to said first elongated arm so as to prevent pivoting of said second elongated arm around the shaft, and release means selectively actuable for releasing said arm-engaging means to permit independent rotational movement of said second elongated arm around the shaft so as to accommodate different relative orientations of said first and second elongated arms, said release means including at least one diametric slot in the end of said crank shaft, a shoulder member movable out of and into engagement with said slot so as to allow independent rotation of said second elongated arm when in disengaged relation and to prevent rotation of said second elongated arm independently of rotation of said crank shaft when in slot-engaging orientation, and means biasing said shoulder member into engagement with said slot.

8. In an arrangement in accordance with claim 7, said shoulder member including a collar at one end and the other end being dimensioned for fitting within said slot, a mounting bar rigidly attached to said second elongated arm in perpendicular relation thereto for slidably retaining said collar, said biasing means including a spring for normally urging said other end of said shoulder into said slot, said selectively actuable means including a flexible connector attached at one end to said shoulder member for slidably moving said shoulder member parallel to the axis of said mounting bar away from said slot, and hook means attached to the other end of said flexible connector in manually accessible proximity to said grip bar associated with said second elongated arm.

9. In an arrangement in accordance with claim 8, said mounting bar including a longitudinally hollow member having a pair of grooves through opposite sides thereof parallel to the axis of said hollow member and further having a radially extending flange at the end thereof opposite said second assembly arm for retaining said spring between said flange and said collar, and a pin extending through said collar and said grooves, said flexible connector being connected to said pin internally of said hollow member and extending coaxially through said hollow member so as to exit therefrom at said flange.

10. A tricycle adapted to be powered, steered and controlled by the hands of a cyclist comprising:

a forward wheel and a pair of rear wheels, each rotatable about its central axis, a frame disposed substantially in a common substantially horizontal plane with the central axes of said forward and rear wheels including two rear wheel axle mounts for positioning the rear wheels in parallel, spaced-apart relation to one another and further having a seat attached thereto in proximity to said rear wheels, said frame having upper and lower elongated tubular support portions arranged in a substantially vertical plane and extending from a forward portion to a rearward portion of said frame, a steering column connected at one end to said forward wheel and connected in laterally pivotal relation to said horizontal frame at a portion intermediate of said steering column laying substantially in said common plane, said steering column gradually sloping upwardly and rearwardly from said forward wheel at a low gradual angle with respect to said horizontal frame, a shaft rotatably journaled to the end of said steering column opposite said foward wheel, a crank assembly attached to said shaft in a location accessible to said cyclist occupying said seat, said crank assembly including a pair of elongated arms one on either side of said steering column and a pair of grip bars each secured to an associated said elongated arm in axially offset relation to said shaft but extending outwardly in perpendicular relation to opposite sides of said steering column, a pair of sleeves mounted on respective said grip bars for free rotation therearound, lever means attached to at least one said sleeve, drive means connected to said crank assembly for transferring rotary torque therefrom to the front wheel, and a pair of upwardly opening channel members secured to said elongated portions and disposed on opposite sides and forwardly of said seat to receive the backs of the legs of said cyclist for supporting each leg of the cyclist when seated on said tricycle.

11. In a tricycle in accordance with claim 10, further including means independently suspending said rear wheels in relation to said rear wheel axle mounts, and at least one upright support member suspended in rigid relation to one of said rear wheels and braking means attached to the upper end of said upright support member for applying braking force to the associated said rear wheel.

12. A tricycle in accordance with claim 10 including selectively actuable means having a pair of braking means for braking at least two wheels, a first flexible connector interconnecting one of said braking means and said lever means, second lever means attached to the other said sleeve, a second elongated flexible connector attached at one end to said second lever means and at the other end to the other of said braking means, and a pair of arcuate guide channels attached to respective said sleeves for maintaining the associated said flexible connector clear of said grip bars and said column.

13. A wheeled vehicle comprising in combination:

at least one ground-engaging front wheel and a pair of rear spaced ground-engaging wheels, a chassis interconnecting said wheels including a main frame having tubular members extending horizontally in the substantial plane of the axes of said wheels, a pair of rear suspension members for connecting said rear wheels to said main frame, a seat portion between said rear wheels, and front wheel support means including a pivotal support post attached to said tubular members at the forward extremity of said main frame, and brace members pivotal about a substantially vertical axis through said pivotal support post and extending forwardly from said pivotal support post for journaled connection to the front wheel axis, suspension means mounted on each of said pair of rear suspension members connecting each said rear wheel to an associated rear suspension member for independent movement of each said rear wheel with respect to said chassis, a steering column extending rearwardly from and rigidly connected to said front wheel brace members, said column inclining rearwardly and upwardly at a relatively low gradual angle above said main frame and terminating forwardly of said seat portion, said steering column pivotally connected to said pivotal support post for lateral pivotal movement about the substantially vertical axis through said support post, and power transmission means extending between the rearward terminal end of said steering column and said front wheel axis including hand-engaging drive means at the rearward terminal end whereby an operator seated on said vehicle can propel said vehicle by operation of said drive means while steering said vehicle by laterally pivoting said steering column about said pivotal support post.

14. A wheeled vehicle in accordance with claim 13 wherein said front wheel brace members extend forwardly in a substantially horizontal direction and include two pairs of side arms with said side arms of each pair being rigidly interconnected in a generally U-shaped fork configuration, the axle of said front wheel being rotatably journaled between the open ends of said fork configuration with the central portion of said fork configuration being rigidly attached to the respective upper and lower ends of said post.

* * * * *